US012748581B2

(12) United States Patent
Jancso et al.

(10) Patent No.: US 12,748,581 B2
(45) Date of Patent: Sep. 29, 2026

(54) SYSTEMS AND METHODS TO AUTOMATICALLY CREATE RUNTIME ENVIRONMENTS

(71) Applicant: Palantir Technologies Inc., Aventura, FL (US)

(72) Inventors: Zsombor Jancso, London (GB); Akshay Agrawal, Jersey City, NJ (US); Alay Dilipbhai Shah, Santa Clara, CA (US); Anshul Ajit Lodha, Santa Clara, CA (US); David Cohen, Denver, CO (US); Ilya Nepomnyashchiy, Mountain View, CA (US); Justin Cassidy, San Jose, CA (US); Jessie Anderson, Washington, DC (US); Michael Glazer, Portland, OR (US); Rory Grant, Seattle, WA (US); Vibha Kathuria, San Jose, CA (US); Volodymyr Kot, London (GB); Xinyi Fu, Thornhill (CA)

(73) Assignee: Palantir Technologies Inc., Aventura, FL (US)

( * ) Notice: Subject to any disclaimer, the term of this patent is extended or adjusted under 35 U.S.C. 154(b) by 74 days.

(21) Appl. No.: 18/523,278

(22) Filed: Nov. 29, 2023

(65) Prior Publication Data

US 2024/0211228 A1 Jun. 27, 2024

Related U.S. Application Data

(60) Provisional application No. 63/434,691, filed on Dec. 22, 2022.

(51) Int. Cl.

| | |
|---|---|
| ***G06F 8/61*** | (2018.01) |
| ***G06F 9/54*** | (2006.01) |
| ***H04L 29/06*** | (2006.01) |
| ***H04L 67/10*** | (2022.01) |

(52) U.S. Cl.
CPC .................................... *G06F 8/61* (2013.01)

(58) Field of Classification Search
CPC ................ G06F 8/60; G06F 8/61; G06F 8/65
See application file for complete search history.

(56) References Cited

U.S. PATENT DOCUMENTS

| | | | | |
|---|---|---|---|---|
| 7,680,752 | B1 * | 3/2010 | Clune, III | G06Q 10/06 706/45 |
| 11,106,455 | B2 | 8/2021 | Myers et al. | |
| 11,277,471 | B2 | 3/2022 | Brandwine et al. | |
| 11,288,053 | B2 | 3/2022 | Myers et al. | |

(Continued)

*Primary Examiner* — S. Sough
*Assistant Examiner* — Mohammad H Kabir
(74) *Attorney, Agent, or Firm* — Faegre Drinker Biddle & Reath LLP

(57) ABSTRACT

In some examples, methods and systems to automatically create runtime environments are provided. For example, a method includes: receiving a request to create a runtime environment; automatically generating a cluster of nodes based on the request, wherein the cluster of nodes are configured to run one or more containerized applications for the runtime environment; automatically applying a manifest onto the cluster of nodes, wherein the manifest includes one or more configurations associated with the runtime environment; and automatically deploying one or more software products into the cluster of nodes.

19 Claims, 8 Drawing Sheets

(56) References Cited

U.S. PATENT DOCUMENTS

| | | | | |
|---|---|---|---|---|
| 2011/0231440 | A1* | 9/2011 | Vlaovic | G06F 8/71 707/769 |
| 2018/0075163 | A1* | 3/2018 | Park | G06F 16/248 |
| 2018/0324204 | A1* | 11/2018 | McClory | G06F 9/5027 |
| 2022/0137605 | A1* | 5/2022 | Albrecht | G05B 19/41845 700/11 |
| 2022/0334725 | A1 | 10/2022 | Mertes et al. | |
| 2022/0350642 | A1 | 11/2022 | Poddar et al. | |
| 2023/0088202 | A1 | 3/2023 | Myers et al. | |
| 2023/0244466 | A1* | 8/2023 | Shah | G06F 9/541 717/178 |

* cited by examiner

SYSTEMS AND METHODS TO AUTOMATICALLY CREATE RUNTIME ENVIRONMENTS

CROSS REFERENCE TO RELATED APPLICATIONS

This application claims priority to U.S. Provisional Application No. 63/434,691, entitled "SYSTEMS AND METHODS TO AUTOMATICALLY CREATE RUNTIME ENVIRONMENTS," and filed on Dec. 22, 2022, which is incorporated by reference herein for all purposes in its entirety.

TECHNICAL FIELD

Certain embodiments of the present disclosure relate to automatically creating runtime environments. More particularly, some embodiments of the present disclosure relate to automatically deploying software products to runtime environments of a cluster of nodes that are generated with specified configurations.

BACKGROUND

Software services often do not provide an automated way for developers or customers to create runtime environments managed by software supply chain systems that are inclusive of backing clusters. Backing clusters are resources (e.g., servers, databases, and/or other infrastructure components) that support the deployment and operation of software products. In a runtime environment, a software product is typically deployed and executed on a set of resources (sometimes called nodes) that form a cluster. The cluster is a backing cluster because it backs (e.g., supports/enables) the deployment and/or execution of the software product in the runtime environment. In some instances, backing clusters provide computational, storage, and/or networking capabilities to execute the software product and/or associated services. Manually creating runtime environments managed by software supply chain systems that are inclusive of backing clusters makes it challenging for developers to engage in destructive testing, for business development personnel to maintain simulated-customer environments, and/or for software supply chain system customers to deploy new environments, as a few examples.

Hence, it is desirable to improve techniques for automatically creating runtime environments.

SUMMARY

Certain embodiments of the present disclosure relate to automatically creating runtime environments. More particularly, some embodiments of the present disclosure relate to automatically deploying software products to runtime environments of a cluster of nodes that are generated with specified configurations.

At least some aspects of the present disclosure are directed to a method to automatically create runtime environments. The method includes: receiving a request to create a runtime environment, and automatically generating a cluster of nodes based on the request. The cluster of nodes are configured to run one or more containerized applications for the runtime environment. The method further includes automatically applying a manifest onto the cluster of nodes. The manifest includes one or more configurations associated with the runtime environment. The method further includes automatically deploying one or more software products into the cluster of nodes. The method can be performed using one or more processors.

At least some aspects of the present disclosure are directed to a system to automatically create runtime environments. The system includes one or more processors and memory storing instructions that, when executed by the one or more processors, cause the system to perform a set of operations. The set of operations include receiving a request to create a runtime environment, and automatically generating a cluster of nodes based on the request. The cluster of nodes are configured to run one or more containerized applications for the runtime environment. The set of operations further include automatically applying a manifest onto the cluster of nodes. The manifest includes one or more configurations associated with the runtime environment. The set of operations further include automatically deploying one or more software products into the cluster of nodes.

At least some aspects of the present disclosure are directed to a method to automatically create runtime environments. The method includes: receiving a request to create a runtime environment, and automatically generating a cluster of nodes based on the request. The cluster of nodes are configured to run one or more containerized applications for the runtime environment. The method further includes automatically applying a manifest onto the cluster of nodes. The manifest includes one or more configurations associated with the runtime environment. The method further includes automatically deploying one or more software products into the cluster of nodes, receiving an indication of an upgrade that corresponds to at least one of the one or more software products, and modifying the runtime environment, based on the indication, to upgrade the at least one of the one or more software products. The method can be performed using one or more processors.

Depending upon embodiment, one or more benefits may be achieved. These benefits and various additional objects, features and advantages of the present disclosure can be fully appreciated with reference to the detailed description and accompanying drawings that follow.

DETAILED DESCRIPTION

Figure 1:
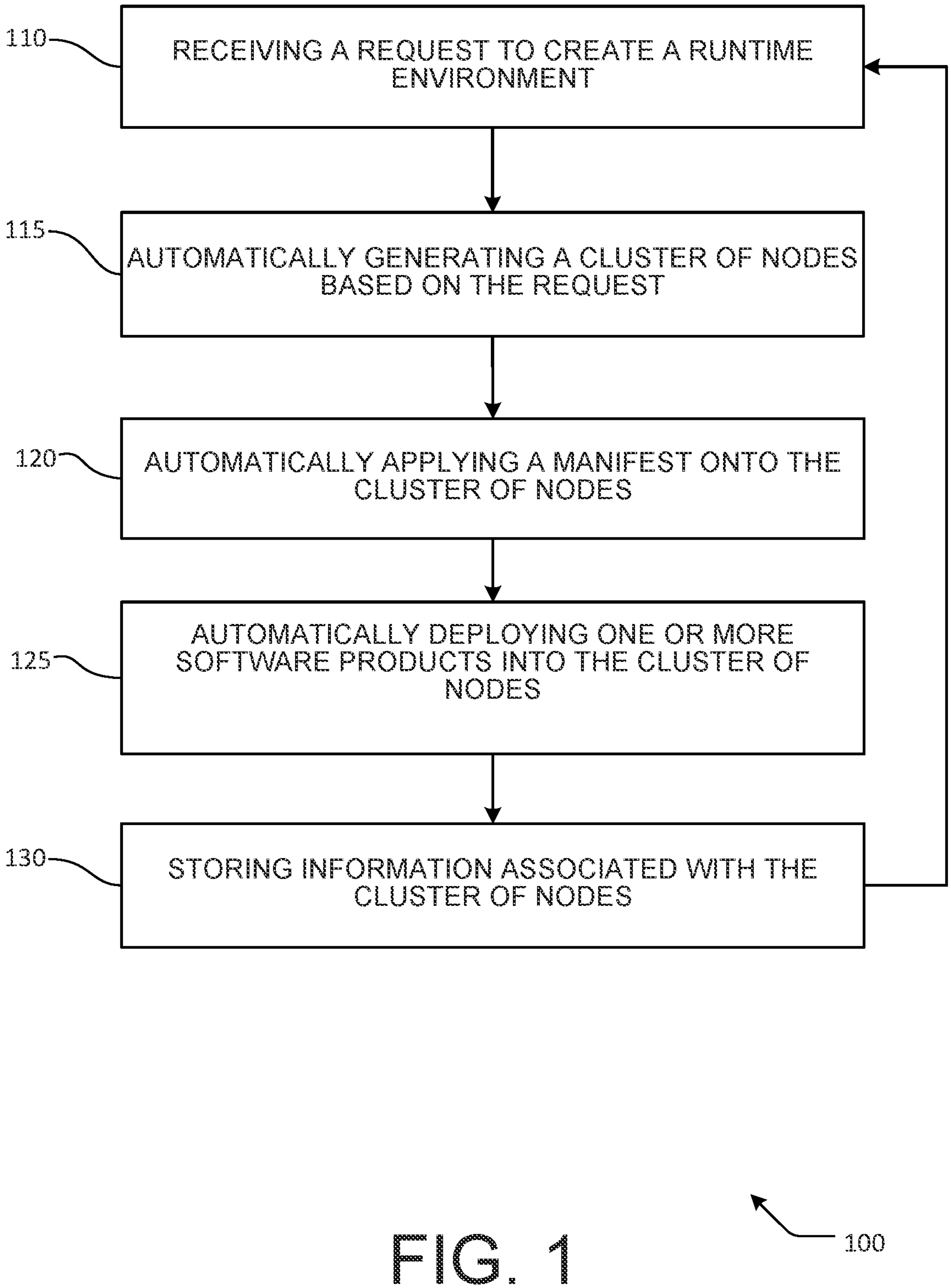
FIG. 1 illustrates a simplified diagram showing a method for automatically creating runtime environments, according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods often do not provide an automated way for developers or customers to create runtime environments managed by software supply chain systems that are inclusive of backing clusters. Backing clusters are resources (e.g., servers, databases, and/or other infrastructure components) that support the deployment and operation of software products. In a runtime environment, a software product is typically deployed and executed on a set of resources (sometimes called nodes) that form a cluster. The cluster is a backing cluster because it backs (e.g., supports/enables) the deployment and/or execution of the software product in the runtime environment. In some instances, backing clusters provide computational, storage, and/or networking capabilities to execute the software product and/or associated services. Conventional systems and methods typically require runtime environments to be manually created, configured for testing, and/or destroyed. This makes it challenging for developers to engage in destructive testing, for business development personnel to maintain simulated-customer environments, and/or for software supply chain system customers to deploy new environments.

Various embodiments of the present disclosure can achieve benefits and/or improvements by a computing system. In some embodiments, benefits include significant improvements, including, for example efficiently (e.g., with respect to time and/or computing resources) creating runtime environments. In some embodiments, benefits including efficiently destroying runtime environments, such as by automatically destroying the runtime environments at specified times. In some embodiments, benefits include that clusters of nodes are automatically configured using a manifest, which can reduce risks of configuration errors, especially across large scale clusters.

In some embodiments, environments discussed herein may be at least one of a deployment environment, a testing environment, a production environment, a beta environment, a virtual environment, and/or another type of environment that may be recognized by those of ordinary skill in the art.

In some embodiments, a cluster is a set of nodes that run containerized applications. For example, a cluster can be a group of interconnected computers and/or servers that work together to provide a unified set of services or applications. Clusters may be used to increase the availability, scalability, and/or performance of software applications.

In some embodiments, a containerized application (e.g., a container) is a package of one or more applications that include dependencies (e.g., software libraries) and/or necessary services to run the containerized application. For example, a containerized application is a software application that is packaged and isolated with all of its dependencies, configurations, files, and/or libraries into a single container that can be easily deployed and run on any platform that supports containerization. In some embodiments, clusters allow for containerized applications to run in an efficient, automated, distributed, secure, and scalable manner. In some embodiments, clusters may be implemented and/or monitored across a plurality of physical, virtual, and/or cloud devices.

In some embodiments, the software supply chain service includes, is part of, and/or interfaces with a deployment management system. In some embodiments, the software supply chain service building, continuously deploying, and/or continuously securing software products in one or more environments. In some embodiments, the deployment management system includes information corresponding to software components, environments, and/or versions of the components. Other types of information that may be available to the deployment management system may be recognized by those of ordinary skill in the art.

In some embodiments, systems and methods described herein allow a user of a software supply chain system to use a user-interface, such as a graphical user-interface, to create an environment (e.g., runtime environment), for example, including one or more clusters. In some embodiments, the software supply chain system automatically deploys a corresponding cluster and installs the environment on that cluster. In some embodiments, a user would have to reference a cluster that already exists, ensure that cluster is compatible with the software supply chain system, and ensure that cluster is appropriately sized for a desired use-case. In some embodiments, systems and methods disclosed herein include a supply chain provenance system that is responsible for provisioning infrastructure appropriate for an environment's needs, and potentially modifying that infrastructure as the environment's needs change.

In some embodiments, a service is installed in a cloud instance (e.g., using a cloud account) that is separate from the software supply chain service and that can run a default or customer-provided bundle (e.g., an infrastructure deployment technology) on-demand to create a cluster for a newly defined runtime environment, and then apply an appropriate manifest supplied by the software supply chain service onto that cluster, causing the software supply chain service to install the requested software products into that cluster. In some embodiments, techniques described herein can be used for internal testing, and to make it easier for customers or users of the software supply chain to launch ephemeral clusters.

Those of ordinary skill in the art will recognize that there are a plurality of different infrastructure types that may be compatible with aspects described herein with respect to clusters. For example, clusters can be provisioned on bare hardware (e.g., a physical server). In some embodiments, clusters can be provisioned on one or more cloud servers.

It should be recognized that mechanisms disclosed herein may be used by a plurality of different software applications, in manners that will be recognized by those of ordinary skill in the art.

FIG. 1 is a simplified diagram showing a method 100 for automatically creating runtime environments according to certain embodiments of the present disclosure. This diagram is merely an example. One of ordinary skill in the art would recognize many variations, alternatives, and modifications. The method 100 for automatically creating runtime environments includes processes 110, 115, 120, 125, and 130. Although the above has been shown using a selected group of processes for the method 100 for automatically creating runtime environment, there can be many alternatives, modifications, and variations. For example, some of the processes may be expanded and/or combined. Other processes may be inserted into those noted above. Depending upon the embodiments, the sequence of processes may be interchanged with others replaced. Further details of these processes are found throughout the present disclosure.

According to some embodiments, at the process 110, a request to create a runtime environment may be received. In some embodiments, the request includes an indication of an expiration data that corresponds to the runtime environment. In some embodiments, the method 100 further includes automatically destroying the runtime environment on the expiration date.

In some embodiments, the request includes an indication of at least one selected from a group consisting of: an environment identifier (e.g., an identifier unique and/or specific to a given environment), an environment description, environment ownership (e.g., which person, organization, and/or system has ownership over an environment), and release channel overrides (e.g., which release channels for deploying software products can be overridden). In some embodiments, the request includes a desired number of nodes and the cluster of nodes includes a number of nodes that correspond to the desired number of nodes.

In some embodiments, the request is received from user-input. In some embodiments, the user-input may be at least one selected from a group consisting of: text data, voice data, gaze data, gesture data, touch data, etc. In some embodiments, the user-input is received at a user-interface, such as a graphical user-interface. In some embodiments, the graphical user-interface may be generated by a computing device and/or displayed on a display screen of the computing device.

According to some embodiments, at the process 115, a cluster of nodes may be automatically generated based on the request. In some embodiments, the cluster of nodes are provisioned on one or more computing devices. In some embodiments, the cluster of nodes may include a plurality of nodes that include one or more of a server (e.g., remote server) or a computing device, such as a local device. In some embodiments, the cluster of nodes may include one or more remote servers, one or more local devices, or one or more local devices and remote servers.

According to some embodiments, at the process 120, a manifest may be automatically applied onto the cluster of nodes. In some embodiments, the manifest includes one or more resource configurations. In some embodiments, the resource configurations include at least one selected from a group consisting of: one or more deployment configurations, one or more services, and/or one or more pods. In some embodiments, the resource configurations include what resources are to be created and how those resources will run inside of a cluster. In some embodiments, the method 100 includes receiving one or more inputs that correspond to the runtime environment and generating the manifest based on the one or more inputs. In some embodiments the one or more inputs are received via user-input and/or via a system that generates the inputs.

In some embodiments, a manifest for software environments is a file that defines configurations and dependencies of a software application or system. For example, the manifest lists software packages, libraries, and/or other components that are required for the application to run, along with their version numbers and any other specific configuration settings.

In some embodiments, the manifest can be used to automate the setup and configuration of a software environment, which can save time and reduce risk of errors. For example, to set up a new development environment for a software application, the manifest can simply be provided to a tool, such as a package manager or configuration management tool, which will automatically install and configure the required components.

In some embodiments, the manifest can also be used to ensure that the software environment is consistent across different platforms and environments. For example, a developer can use the same manifest to set up development, staging, and production environments, which helps to ensure that the application behaves consistently in each environment. Manifest files can be written in a variety of formats, depending on the tools and platforms being used. For example, some formats include YAML Ain't Markup Language (YAML), JavaScript object notation (JSON), and extensible markup language (XML). In some embodiments, package managers and configuration management tools provide their own specific manifest formats, which can be used to automate the installation and configuration of software components.

According to some embodiments, at the process 125, one or more software products may be automatically deployed into the cluster of nodes. In some embodiments, the one or more software products includes at least one or more specific services. In some embodiments, the one or more specific services include a runtime operator (e.g., a software module, an operator, etc.).

According to some embodiments, at the process 130, information associated with the cluster of nodes may be stored. In some embodiments, the method 100 further includes receiving an indication of an upgrade that corresponds to at least one of the one or more software products and modifying the runtime environment, based on the indication, to upgrade the at least one of the one or more software products. In some embodiments, the upgrade is based on at least one of an account or subscription (e.g., an account or subscription associated with a user). In some embodiments, the upgrade may be associated with a cost and the upgrade may or may not be performed based on whether the cost is acceptable for a user (e.g., based on a specific account preference, subscription, plan, etc.).

In some embodiments, the method 100 further includes receiving information about the runtime environment from a runtime operator. In some embodiments, one or more actions to perform based on the received information may be determined. In some embodiments, the one or more actions may be associated with the one or more software products. In some embodiments, the one or more actions may be performed, for example, by the runtime operator or facilitated by the runtime operator. In some embodiments, the one or more actions include deploying a new software product into the cluster of nodes, upgrading a version of a software product in the cluster of nodes, and/or rolling back a version of a software product in the cluster of nodes.

In some embodiments, method 100 may terminate at process 130. In some embodiments, method 100 may return to process 110 (or any other process from method 100) to provide an iterative loop, such as receiving a request to create a runtime environment and automatically returning a cluster of nodes that were generated and configured based on specified parameters.

Figure 2:
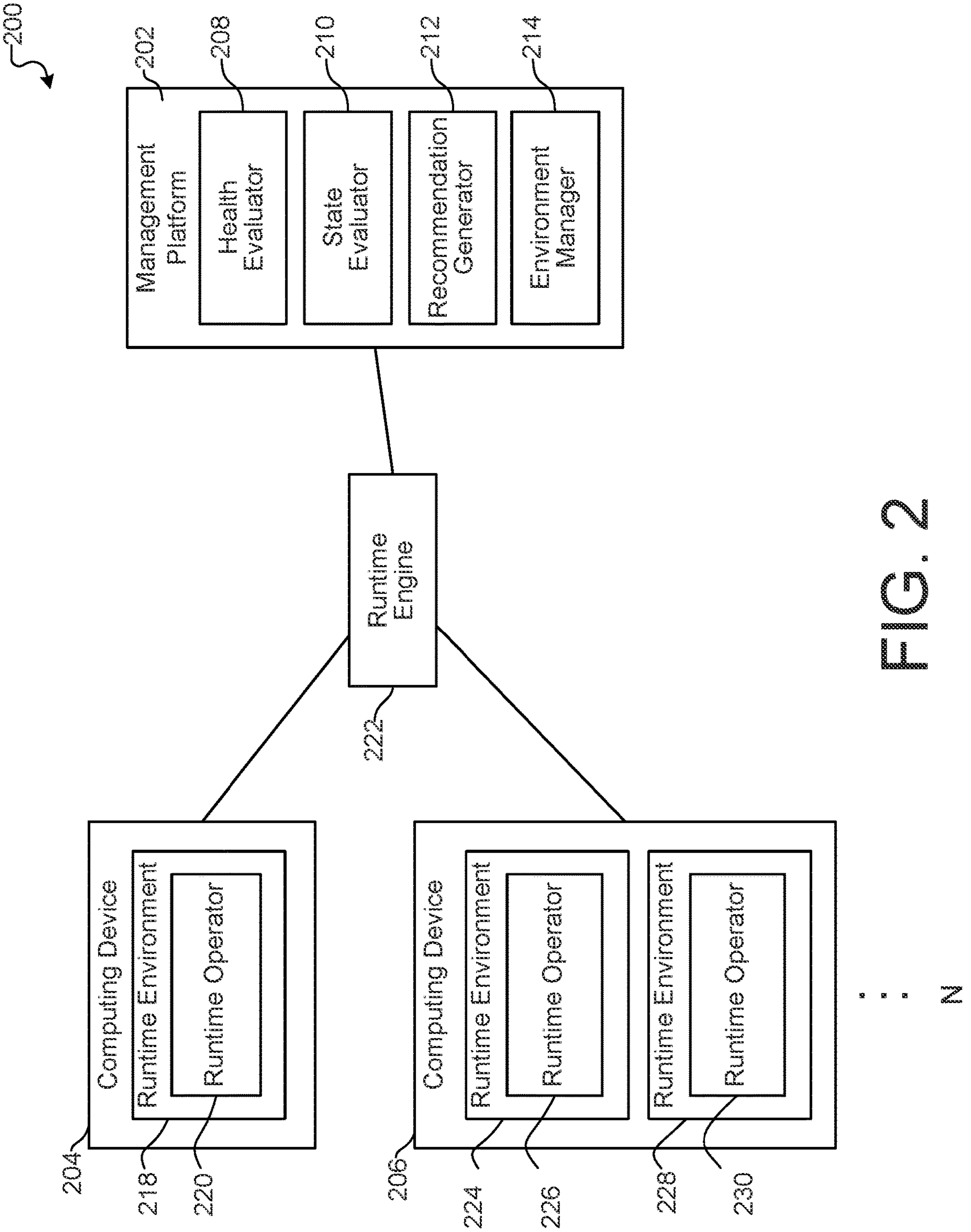
FIG. 2 illustrates an example system for automatically creating runtime environments, according to certain embodiments of the present disclosure.

FIG. 2 shows an example of a system 200, in accordance with some aspects of the disclosed subject matter. In some embodiments, the system 200 is a system for automatically creating runtime environments. FIG. 2 is merely an example. One of the ordinary skilled in the art would recognize many variations, alternatives, and modifications. Although system 200 has been shown using a selected group of components, there can be many alternatives, modifications, and variations. For example, some of the components may be expanded and/or combined. Other components may be inserted into those noted above. Depending upon the example, the arrangement of components may be interchanged with others replaced. Further details of these components are found throughout the present disclosure.

As illustrated, system 200 includes a management platform 202, computing device 204, and computing device 206. It will be appreciated that computing devices 204 and 206 may each be any of a variety of computing devices. In some embodiments, computing devices 204 and 206 may be nodes that form, at least in part, a cluster. Further, computing devices 204 and 206 may be physical computing devices or may be virtual machines, among other examples.

In some embodiments, as illustrated, management platform 202 includes health evaluator 208, state evaluator 210, and recommendation generator 212. In some embodiments, health evaluator 208 evaluates health information associated with a runtime environment (e.g., as may be received from runtime operators 220, 226, and/or 230). In some embodiments, similarly, state evaluator 210 evaluates state information for one or more runtime environments, as may be received from environment manager 214.

Accordingly, in some embodiments, recommendation generator 212 generates a recommendation based on the state information and/or health information associated with a runtime environment. In some embodiments, a generated recommendation may be provided to environment manager 214 for application to one or more runtime environments (e.g., runtime environment 224 and/or 228) associated therewith according to aspects described herein.

In some embodiments, computing device 204 includes runtime environment 218. In some embodiments, aspects of computing device 206 are similar those of computing device 204 and are therefore not necessarily redescribed in detail. In some embodiments, runtime environments 224 and 228 (and associated runtime operators 226 and 230, respectively) may be similar to runtime environment 218 (and associated runtime operator 220).

In some embodiments, environment manager 214 generates state information for runtime environments of computing device 2014 (e.g., runtime environment 218), which is provided to management platform 202 accordingly. In some embodiments, environment manager 214 may thus perform aspects similar to those discussed above with respect to method 100 in FIG. 1. In some embodiments, environment manager 214 uses one or more plugins to manage such runtime environments, each of which may be associated with a given runtime environment type.

In certain embodiments, runtime operator 220 generates health information for an associated runtime environment (e.g., runtime environment 218, runtime environment 228). In some embodiments, the health information may be provided to management platform 202 accordingly. In some embodiments, the runtime operator 220 may thus perform aspects similar to those discussed above with respect to method 100 of FIG. 1.

In some embodiments, environment manager 214 evaluates a recommendation that was received from management platform 202 to manage runtime environment 218 according to aspects described herein. In some embodiments, environment manager 214 may use a plugin to manage runtime environment 218. In some embodiments, at least a part of the recommendation may be provided to runtime operator 220, thereby causing runtime operator 220 to manage aspects of runtime environment 218 accordingly.

In some embodiments, as compared to computing device 204, computing device 206 includes an additional runtime environment. Thus, in some embodiments, it will be appreciated that an environment manager may manage any number of runtime environments according to aspects described herein. Further, in some embodiments, while computing devices 204 and 206 are each illustrated as being managed by a single environment manager, it will be appreciated that, in other embodiments, multiple environment managers may manage runtime environments across multiple computing devices. In some embodiments, a single computing device may include multiple environment managers, as may be the case when each environment manager has a different set of associated plugins and/or corresponds to different virtualization tenants, among other examples.

In some embodiments, system 200 further includes a runtime engine 222 (e.g., a container runtime engine), which may manage execution of runtime environments 218, 224, and 226. In certain embodiments, environment manager 214 uses a plugin associated with runtime engine 222 to manage runtime environments 218, 224, and 228 according to aspects described herein. For instance, environment manager 214 may generate state information for one or more of runtime environments 218, 224, and/or 228, which may be processed by state evaluator 210 and/or recommendation generator 212 to generate a recommendation (e.g., based alternatively or additionally on health information obtained from runtime operator 220, 226, and/or 230) according to aspects described herein. In some embodiments, the recommendation may be processed by environment manager 214 (and/or an associated plugin), such that operation of runtime engine 222 and the associated runtime environments 218, 224, and/or 228 are affected accordingly.

In some embodiments, various components in system 200 can execute software or firmware stored in non-transitory computer-readable medium to implement various processing steps. Various components and processors of system 200 can be implemented by one or more computing devices including, but not limited to, circuits, a computer, a cloud-based processing unit, a processor, a processing unit, a microprocessor, a mobile computing device, and/or a tablet computer. In some cases, various components of system 200 (e.g., recommendation generator 212) can be implemented on a shared computing device. Alternatively, a component of system 200 can be implemented on multiple computing devices. In some implementations, various modules and components of system 200 can be implemented as software, hardware, firmware, or a combination thereof. In some cases, various components of system 200 can be implemented in software or firmware executed by a computing device.

Various components of system 200 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

FIGS. 3-7 illustrate example user-interfaces in accordance with some aspects of the disclosed subject matter. In some embodiments, the user-interface may be used to assist in generating cluster backed development environments with no long-term maintenance costs.

In some embodiments, a user can navigate to a home page and see templates that they can launch, the time it may take to create an environment, a number of times a template was used in the last week to generate an environment, and/or costs associated with generating and/or running the template and/or corresponding environment. In some embodiments, for each of the environments (e.g., stacks), a user may can see if the environment is running or stopped. In some embodiments, a user can see if an environment has an expiration date. In some embodiments, a user can provide a stack or environment name and a description, if desired. In some embodiments, a user can choose an ownership team and co-owners for that environment, and can see what template this is coming from and have release and overrides from the base configuration. In some embodiments, a user can choose to have these services listed on a development channel, a stable channel, and/or another type of channel.

In some embodiments, a user can choose when an environment expires. In some embodiments, the environment shuts down automatically on a date and time that the environment is set to expire. In some embodiments, a user can choose a number of nodes for an environment and see costs associated with the number of nodes. In some embodiments, when launching an environment, a system may register a blank environment on a deployment management system and then try to copy and apply a template from a base template. In some embodiments, mechanisms disclosed herein may create a cluster to run on one or more nodes.

In some embodiments, once an environment is generated, a user and/or system can perform tests within the environment. For example, a user may commit local changes to the environment and run a script to publish them. In some embodiments, the script could be run in response to a comment provided by a user and/or system. In some embodiments, after the script publishes, it can be seen that an update is queued to a newly published version of a software product. In some embodiments, the upgrade can automatically be implemented to the software product in the environment and a status of the upgrade may be displayed to a user. In some embodiments, an artifact may be registered directly with a software supply chain service. In certain embodiments, software artifacts are software components (e.g., source code, compiled code, documentation, design specification, test plans, etc.) incorporated into a software product. In some embodiments, when the software supply chain service sees the new artifact, mechanisms described herein may modify a software product within the environment.

Figure 3:
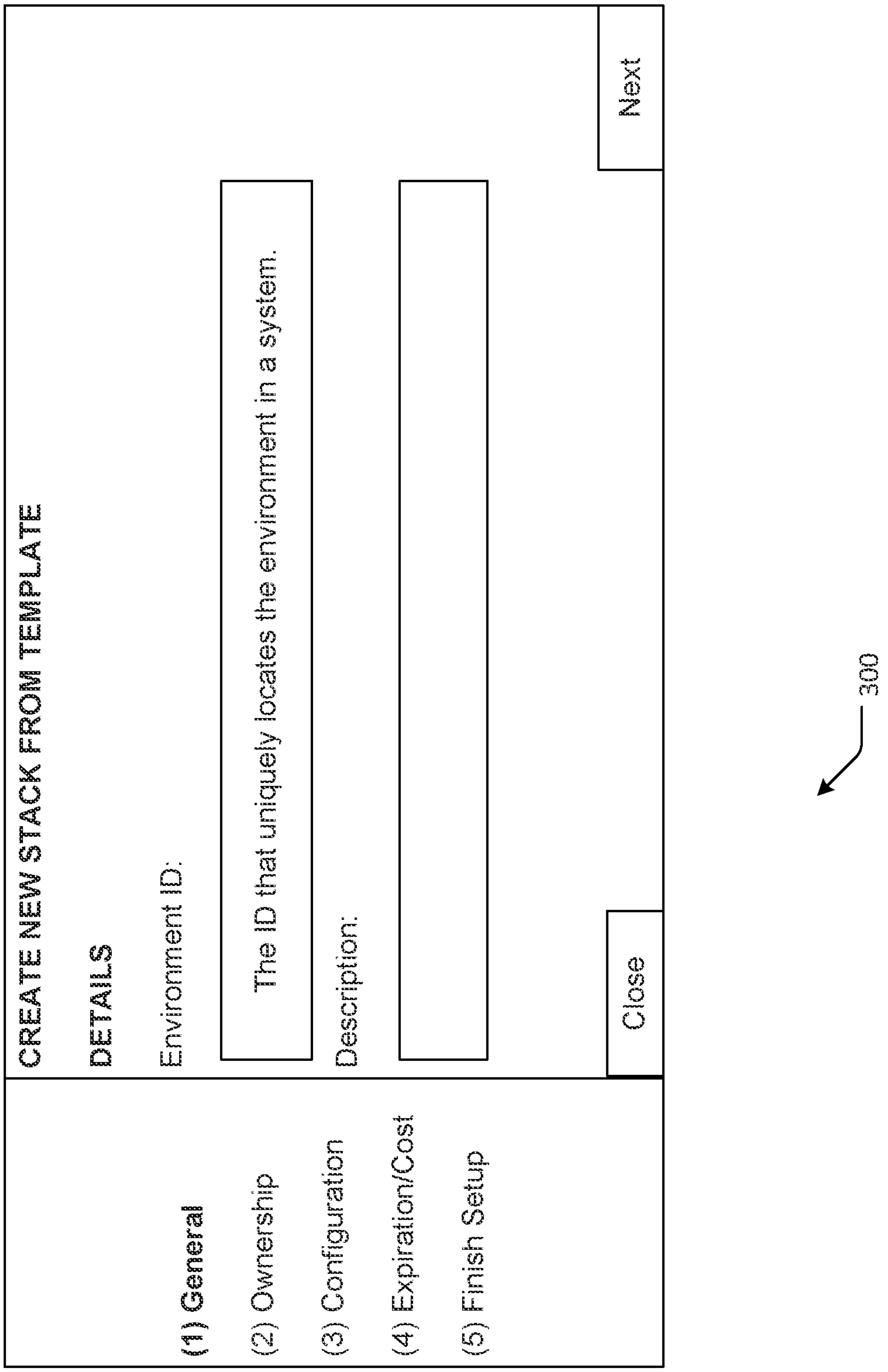
FIG. 3 illustrates an example user-interface, according to certain embodiments of the present disclosure.

FIG. 3 shows an example user-interface (UI) 300, in accordance with some aspects of the disclosed subject matter. FIG. 3 is merely an example. One of ordinary skill in the art would recognize many variations, alternatives, and modifications. In some embodiments, the user-interface 300 is a graphical user-interface (GUI).

In some embodiments, the UI 300 includes steps that allow a user to input parameters for generating an environment (e.g., a runtime environment). In some embodiments, the UI 300 allows a user to input an environment identifier (ID) and/or a description. In some embodiments, the environment ID may be an ID that uniquely locates an environment (e.g., that a user desires to create) within a system (e.g., within one or more memories of the system). In some embodiments, the description may be a user-readable and/or machine-readable description to provide background information regarding an environment that a user desires to create.

In some embodiments, the UI 300 includes a "Close" button that allows a user to discontinue generating the environment. In some embodiments, the UI 300 includes a "Next" button that allows a user to continue onto a subsequent step for generating the environment. In some embodiments, a new UI (e.g., UI 400, 500, 600, 700) may be generated and/or displayed in response to clicking the "Next" button. In some embodiments, the UI 300 may include an indication of on which step a user is currently for generating an environment.

Figure 4:
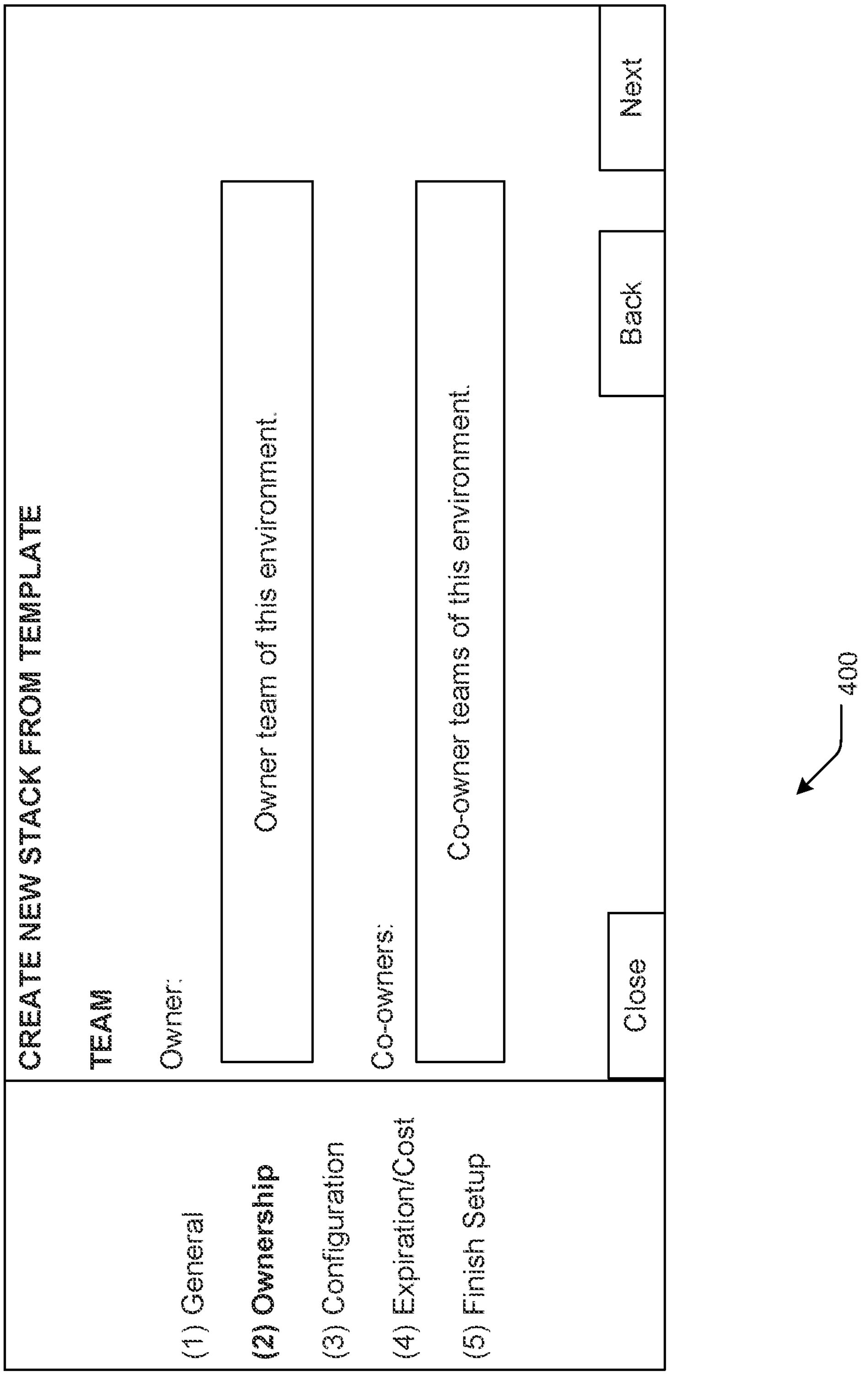
FIG. 4 illustrates an example user-interface, according to certain embodiments of the present disclosure.

FIG. 4 shows an example user-interface (UI) 400, in accordance with some aspects of the disclosed subject matter. FIG. 4 is merely an example. One of ordinary skill in the art would recognize many variations, alternatives, and modifications. In some embodiments, the user-interface 400 is a graphical user-interface (GUI).

In some embodiments, the UI 400 includes steps that allow a user to input parameters for generating an environment (e.g., a runtime environment). In some embodiments, the UI 400 allows a user to input an owner and/or co-owner of the environment. In some embodiments, the owner is an individual, team, organization, and/or system that is designated as the owner for an environment that is to be generated. In some embodiments, the co-owners are individuals, teams, organizations, and/or systems that are designated as co-owners for an environment that is to be generated. In some embodiments, the owners and/or co-owners may be granted specific permissions based on their designation as an owner or co-owner.

In some embodiments, the UI 400 includes a "Close" button that allows a user to discontinue generating the environment. In some embodiments, the UI 400 includes a "Next" button that allows a user to continue onto a subsequent step for generating the environment. In some embodiments, the UI 400 includes a "Back" button that allows a user to return to a previously-generated UI (e.g., UI 300). In some embodiments, the UI 400 may include an indication of on which step a user is currently for generating an environment.

Figure 5:
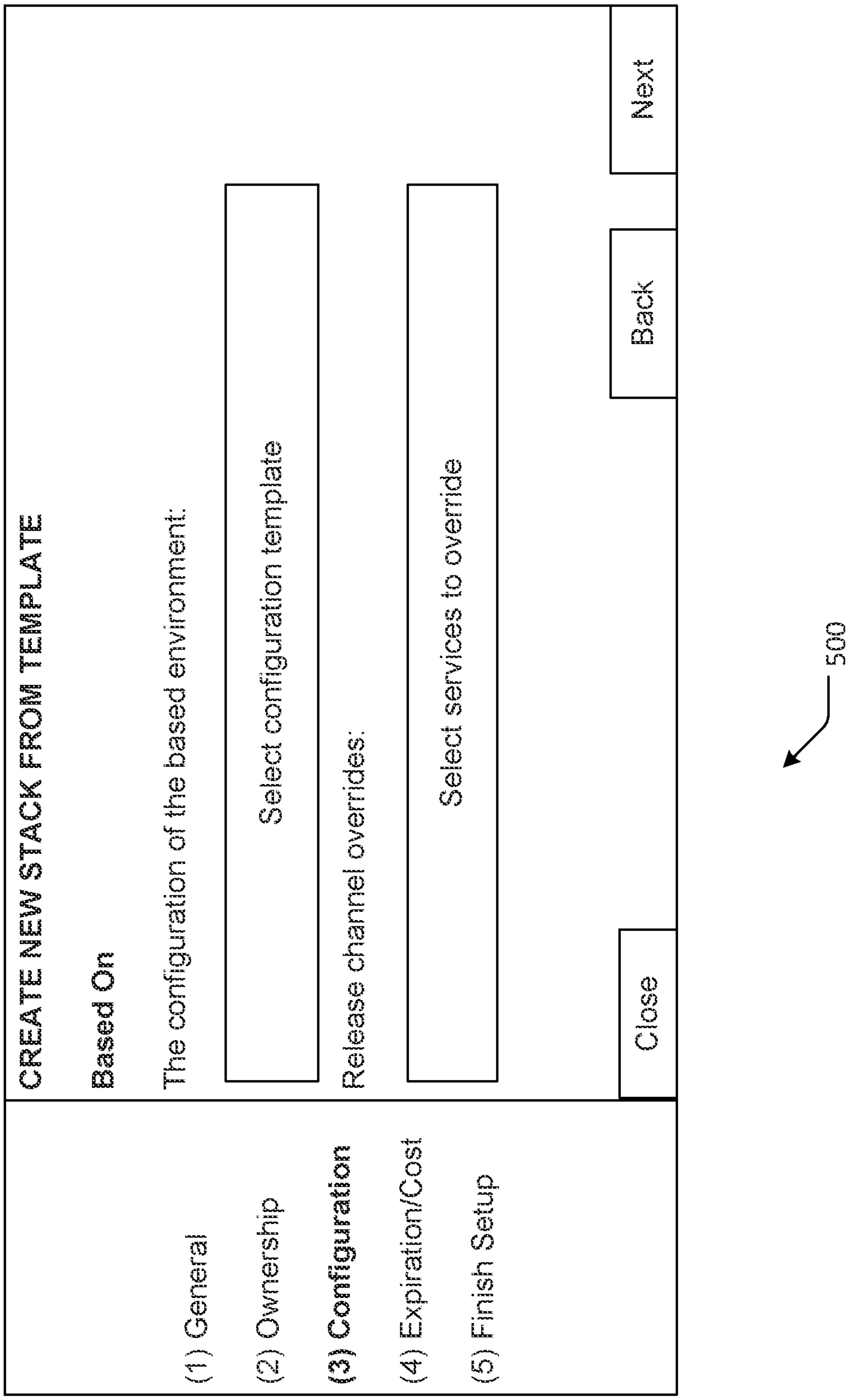
FIG. 5 illustrates an example user-interface, according to certain embodiments of the present disclosure.

FIG. 5 shows an example user-interface (UI) 500, in accordance with some aspects of the disclosed subject matter. FIG. 5 is merely an example. One of ordinary skill in the art would recognize many variations, alternatives, and modifications. In some embodiments, the user-interface 500 is a graphical user-interface (GUI).

In some embodiments, the UI 500 includes steps that allow a user to input parameters for generating an environment (e.g., a runtime environment). In some embodiments, the UI 500 allows a user to input a configuration template for an environment. For example, an environment to be generated may be based on a previously-generated environment and/or a template for an environment. In some embodiments, the UI 500 allows a user to input release channels and/or service to be overridden (e.g., when an environment is generated and/or running).

In some embodiments, the UI 500 includes a "Close" button that allows a user to discontinue generating the environment. In some embodiments, the UI 500 includes a "Next" button that allows a user to continue onto a subsequent step for generating the environment. In some embodiments, the UI 500 includes a "Back" button that allows a user to return to a previously-generated UI (e.g., UI 300, UI 400). In some embodiments, the UI 500 may include an indication of on which step a user is currently for generating an environment.

Figure 6:
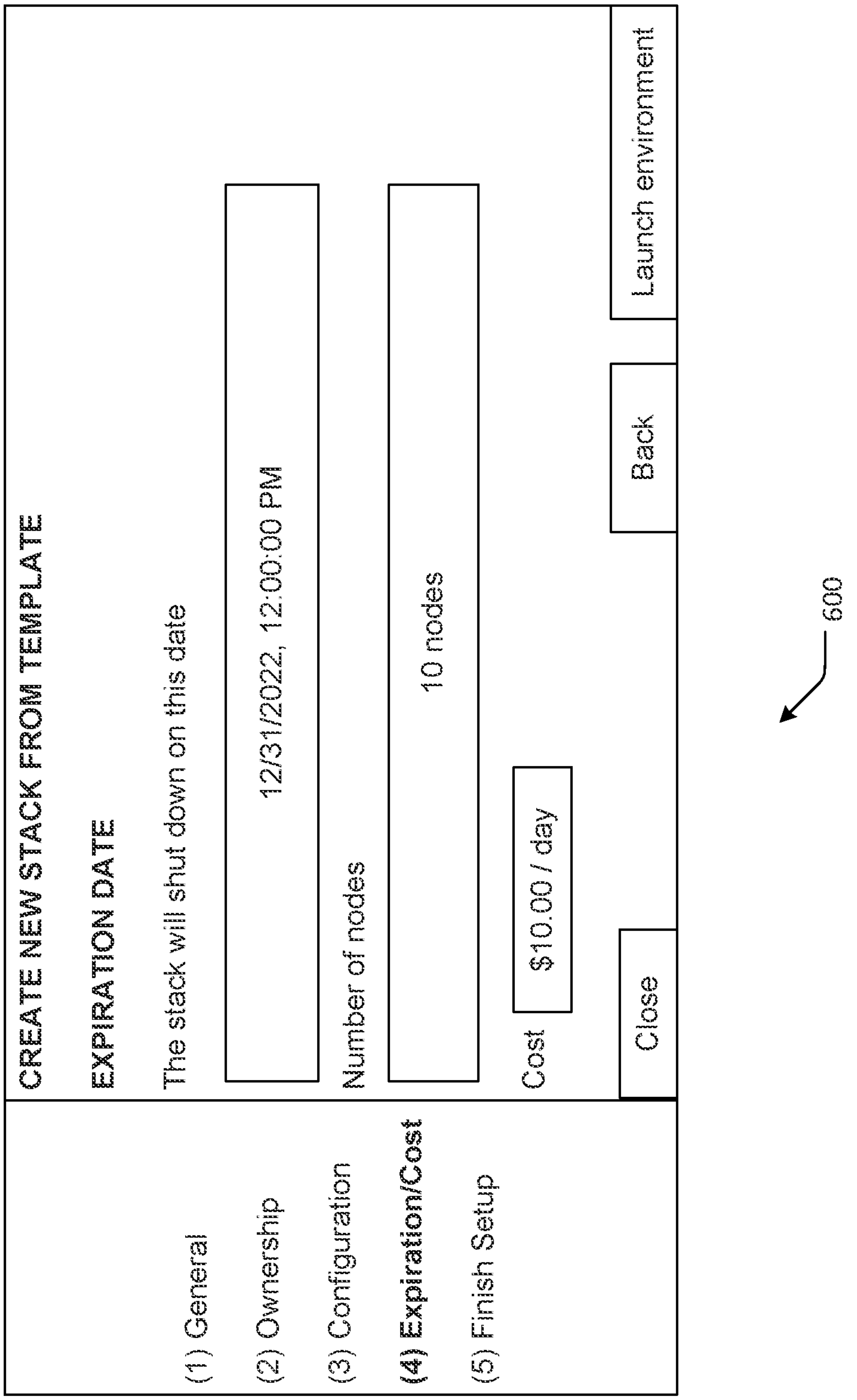
FIG. 6 illustrates an example user-interface, according to certain embodiments of the present disclosure.

FIG. 6 shows an example user-interface (UI) 600, in accordance with some aspects of the disclosed subject matter. FIG. 6 is merely an example. One of ordinary skill in the art would recognize many variations, alternatives, and modifications. In some embodiments, the user-interface 600 is a graphical user-interface (GUI).

In some embodiments, the UI 600 includes steps that allow a user to input parameters for generating an environment (e.g., a runtime environment). In some embodiments, the UI 600 allows a user to input an expiration date for an environment (e.g., stack). The expiration date may include a month, day, year, hours, and/or minute at which an environment will expire. In some embodiments, the UI 600 allows a user to input a number of nodes that will support an environment. For example, the user may input 1 node, 5 nodes, 10 nodes, 15, nodes, or any other number of nodes. In some embodiments, a cost may be generated based on the inputs that a user provides (e.g., that are received via UI 300, UI 400, UI 500, and/or UI 600). In some embodiments, the cost may provide an indication to a user of how much running the desired environment will cost.

In some embodiments, the UI 600 includes a "Close" button that allows a user to discontinue generating the environment. In some embodiments, the UI 600 includes a "Back" button that allows a user to return to a previously-generated UI (e.g., UI 300, UI 400, UI 500). In some embodiments, the UI 600 includes a "Launch Environment" button that allows a user to launch an environment based on provided inputs (e.g., parameters received via UI 300, UI 400, UI 500, and/or UI 600). In some embodiments, the UI 600 may include an indication of on which step a user is currently for generating an environment.

Figure 7:
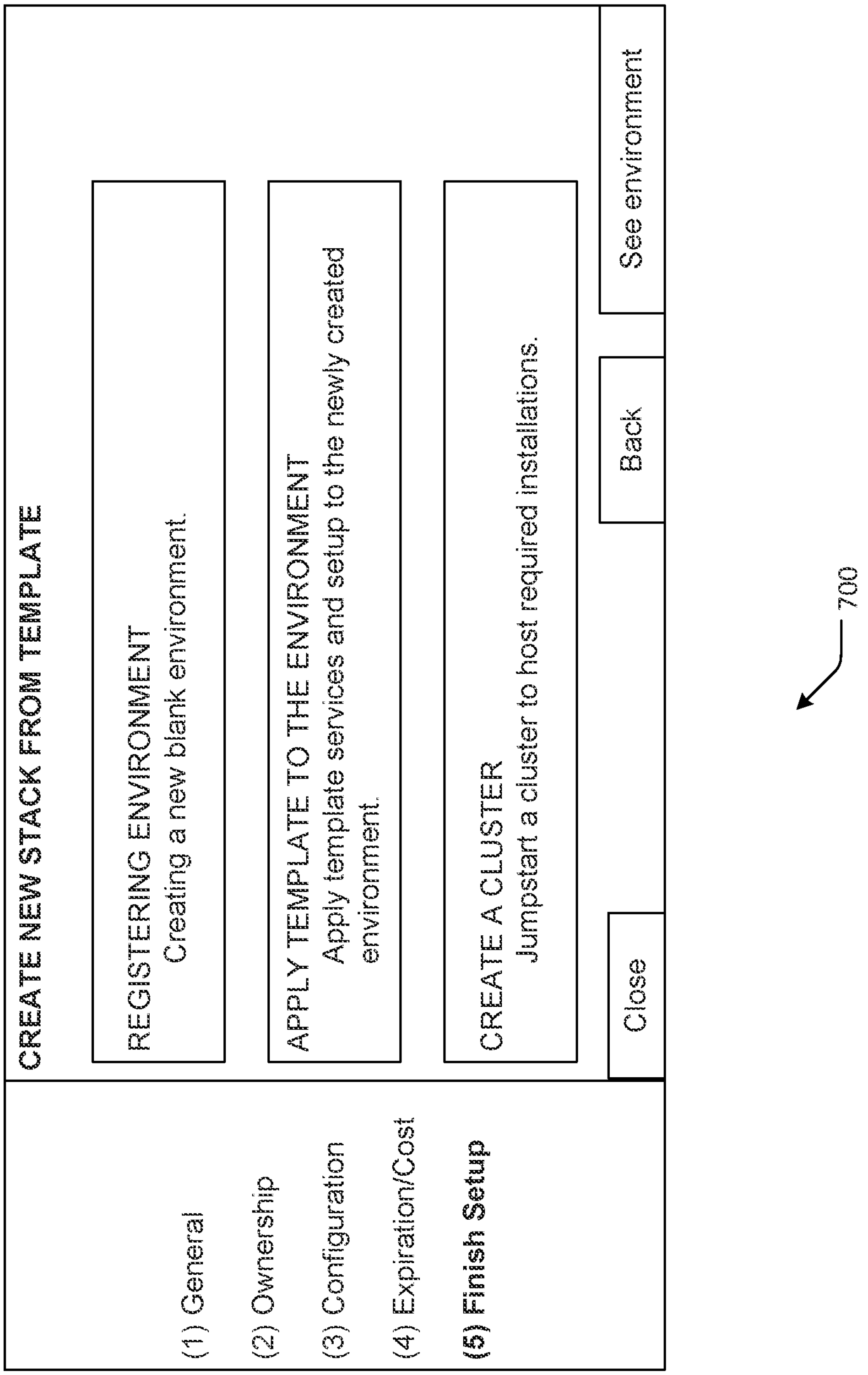
FIG. 7 illustrates an example user-interface, according to certain embodiments of the present disclosure.

FIG. 7 shows an example user-interface (UI) 700, in accordance with some aspects of the disclosed subject matter. FIG. 7 is merely an example. One of ordinary skill in the art would recognize many variations, alternatives, and modifications. In some embodiments, the user-interface 700 is a graphical user-interface (GUI).

In some embodiments, the UI 700 provides a first indication that an environment is being registered. For example, the first indication may display to a user when a new blank environment is being created. In some embodiments, the first indication is a visual indication. In some embodiments, the first indication may include an auditory indication.

In some embodiments, the UI 700 provides a second indication that a template is being applied to the environment. In some embodiments, the template may be or include a manifest with configurations associated with the environment. In some embodiments, template services are applied and setup to the newly created environment. In some embodiments, the second indication is a visual indication. In some embodiments, the second indication may include an auditory indication.

In some embodiments, the UI 700 provides a third indication that a cluster is being created. In some embodiments, a cluster is jumpstarted to host required installations. In some embodiments, the cluster may include one or more nodes that are provisioned to execute one or more services. In some embodiments, the third indication is a visual indication. In some embodiments, the third indication may include an auditory indication.

In some embodiments, the UI 700 includes a "Close" button that allows a user to discontinue generating the environment. In some embodiments, the UI 700 includes a "Back" button that allows a user to return to a previously-generated UI (e.g., UI 300, UI 400, UI 500, UI 600). In some embodiments, the UI 700 includes a "See Environment" button that allows a user to view data associated with the launched environment. In some embodiments, the UI 700 may include an indication of on which step a user is currently for generating an environment.

In some embodiments, a user who desires to run an application can have a cluster automatically provisioned for them and managed by a software supply chain service. In some embodiments, the application may be auto-upgraded after that point. In some embodiments, aspects described herein can be useful for people who want to test things on specific infrastructure easily and/or to create an environment for one or more services that is managed by a software supply chain service. In some embodiments, a set of services are created that a user can play with (e.g., in a testing environment) and they get automatically upgraded over time.

In some embodiments, methods described herein allow for the ability to algorithmically create and/or generate ephemeral environments via software code. In some embodiments, mechanisms described herein can be used for automated creation, testing, and/or destruction of environments, not just manually doing so. In some embodiments, software can be configured to create a machine in the cloud to perform certain tasks and then kill it automatically if the tasks execute successfully. In some embodiments, if the tasks do not execute successfully, then an error may be generated.

In some embodiments, a software supply chain service creates an environment and automatically generates a cluster. In some embodiments, the environment may be automatically installed on that cluster. In some embodiments, the cluster could be destroyed and/or terminated, for example after testing being performed on the cluster is completed. In some embodiments, the cluster includes a master node and working nodes. In some embodiments, the master node manages the working nodes and the working nodes manage containerized applications.

In some embodiments, the cluster may be generated using an application programming interface (API) or other web service that is configured to generate clusters.

In some embodiments, an environment includes specific versions of services that are configured to be running on a cluster. In some embodiments, an initial registration is performed to connect a cluster to a software supply chain service. In some embodiments, the initial registration is performed via a user-interface and/or an API. In some embodiments, a program running in a cluster may be installed to communicate with the software supply chain service and download additional components that may need to be installed. In some embodiments, the agent that communicates or interfaces with the software supply chain service, such as to download or install additional components, may be an operator.

In some embodiments, security keys are generated and the operator is configured to be granted permission to communicate with the software supply chain service. In some embodiments, downloads and installations can only occur after the operator has been authenticated to communicate between the cluster and the software supply chain service, based on the security keys.

In some embodiments, clusters can be expanded or scaled, such as to run additional services and/or programs. In some embodiments, scaling the clusters can include provisioning additional computational resources (e.g., processors, memory, batteries, devices, etc.) for the clusters. In some embodiments, the clusters can be scaled manually. In some embodiments, the clusters can be scaled automatically. In some embodiments, the cluster may be initially created based on information provided to a user-interface. In some embodiments, one or more nodes that define, at least in part, the cluster are cloud nodes. In some embodiments, one or more nodes are local nodes. In some embodiments, the cluster may be run in one or more cloud servers. In some embodiments, the cluster may be run on one or more local devices.

In some embodiments, environments may be stacks that have services running with a large dependency tree where multiple components depend on each other. In some embodiments, mechanisms disclosed herein aim to make sure a stack always stays upgraded using software supply chain service infrastructure, such as when dependencies between components are being updated or otherwise changed.

In some embodiments, a production environment can be copied for testing. In some embodiments, a test environment can be generated for a system or user to experiment with, and then a close of the test environment can go straight to production. In some embodiments, a production safe environment is one that can be safely run inside of a customer's network or in a secure location where it's supposed to be run for production. In some embodiments, mechanisms disclosed herein allow for systems or users to experiment with an environment and then make a copy of it into a new environment that can be run on production hardware, such as inside of a customer's network.

In some embodiments, an environment is applied to a cluster via a manifest. In some embodiments, a manifest is a specific file format that a cluster expects to install one or more services (e.g., an operator). In some embodiments, the manifest is used to install one or more service and/or configure one or more parameters in an environment.

In some embodiments, a request can be made to a software supply chain service to receive a security key to upload one or more elements to a cluster. In some embodiments, the request is made automatically. In some embodiments, the request is an authentication request. In some embodiments, an operator is something that runs in an environment (e.g., runtime environment) which may be executed on one or more nodes of a cluster. In some embodiments, an operator is a container that can run in a cluster and that can affect the state of that cluster.

In some embodiments, the operator is configured to tell the software supply chain service a state of a cluster. In some embodiments, the software supply chain service may reply based on the state of the cluster in determining what subsequent action to perform. In some embodiments, the software supply chain service may then perform the determined action. In some embodiments, the software supply chain service may have the information on which services are supposed to be running in the cluster. In some embodiments, the software supply chain service will prompt a user or system to install a log-in service or another service, such that for example an operator will download the log-in service, instruct a cluster to run the service, and then send an indication, via the operator, to the software supply chain service indicating that the cluster is running the service. In some embodiments, the software supply chain service will provide an indication to the operator that a new version of a service is available. In some embodiments, the software supply chain service will provide instructions for the cluster (e.g., via the operator) to run a pod or node with the new version of the service and blow away the pod of the old version of the service.

In some embodiments, two jobs that the operator executes are to summarize a state of the software supply chain service and to perform various actions that the software supply chain service would like to be performed based on the state thereof. In some embodiments, different services or types of software may each have respective operators. In some embodiments, the operator has the capability of describing the state of a cluster to the software supply chain service and then actioning on the software supply chain service's response of what should be done based on that information.

In some embodiments, mechanisms described herein have the ability to modify deployed environments in clusters and know or calculate the cost of actions performed in the clusters. In some embodiments, the clusters may be modified based on cost-based rules, such as upgrading or downgrading a service based on a cost value associated with a specific customer. In some embodiments, cost-based rules could be triggers to upsize and/or downsize clusters. In some embodiments, different customers may have subscribed to different services, and deciding whether to upgrade a service for a specific customer may depend on the subscription associated with the specific customer. In some embodiments, subscriptions that are associated with one or more customers may be determined at the time of installation, such as a first person being on Plan A and receiving an upgraded version of the service, while a second person being on Plan B may continue to run an old version of the service.

In some embodiments, infrastructure is provisioned based on a generated cluster. In some embodiments, configuration language may be used for deploying clusters across infrastructure. In some embodiments, the software supply chain service includes an agent that can run on the infrastructure, and that can do the two things which are described as state of the cluster and perform actions that are recommended by the software supply chain service.

In some embodiments, aspects described herein can run on various types of networks (e.g., public networks, private networks, university networks, classified networks) so that people developing in spaces associated with such networks can have ephemeral testing drivers for software products that they are building. In some embodiments, aspects of the present disclosure may be desirable for customers that have a particular containerization platform or execution platform that is not based on containers.

In some embodiments, aspects of the present disclosure may be desirable for testing. In some embodiments, an infrastructure (e.g., a container infrastructure) can be created and loaded with a large number of requests in a short time (e.g., a thousand requests a second) to see if it works or not. In such embodiments, if the infrastructure works successfully then it may be duplicated or allowed to continue running, and if it does not perform successfully, then it may be terminated. Other types of tests that can be performed at the infrastructure level will be recognized by those of ordinary skill in the art.

In some embodiments, pods themselves, such as individual containers within a cluster, will specify their own hardware requirements (e.g., four graphics processors, 32 gigabytes of random-access-memory, etc.). In some embodiments, the actual configuration of the hardware or virtualized hardware (e.g., for cloud providers) is determined automatically. In some embodiments, includes configuring hardware (e.g., provisioning infrastructure) which means determining what hardware is needed and any configuration changes that need to be made.

In some embodiments, what an operator does or what services nodes perform go into configuration files. In some embodiments, what resources are needed when a service is running (e.g., nodes, memory, etc.) is based on the configuration files. In some embodiments, computational resource requirements are listed in the configuration file. In some embodiments, if a system cannot satisfy the computational resource requirements, the system may indicate that is cannot let the service run because it does not have the necessary resources (e.g., processors, memory, nodes, etc.).

In some embodiments, an environment is a collection of services. In some embodiments, an operator may provide an indication to a software supply chain service that a first service from the collection of services is an old version. In some embodiments, the software supply chain provenance server may provide instructions for the operator to automatically upgrade the first service from the older version to a new version.

Figure 8:
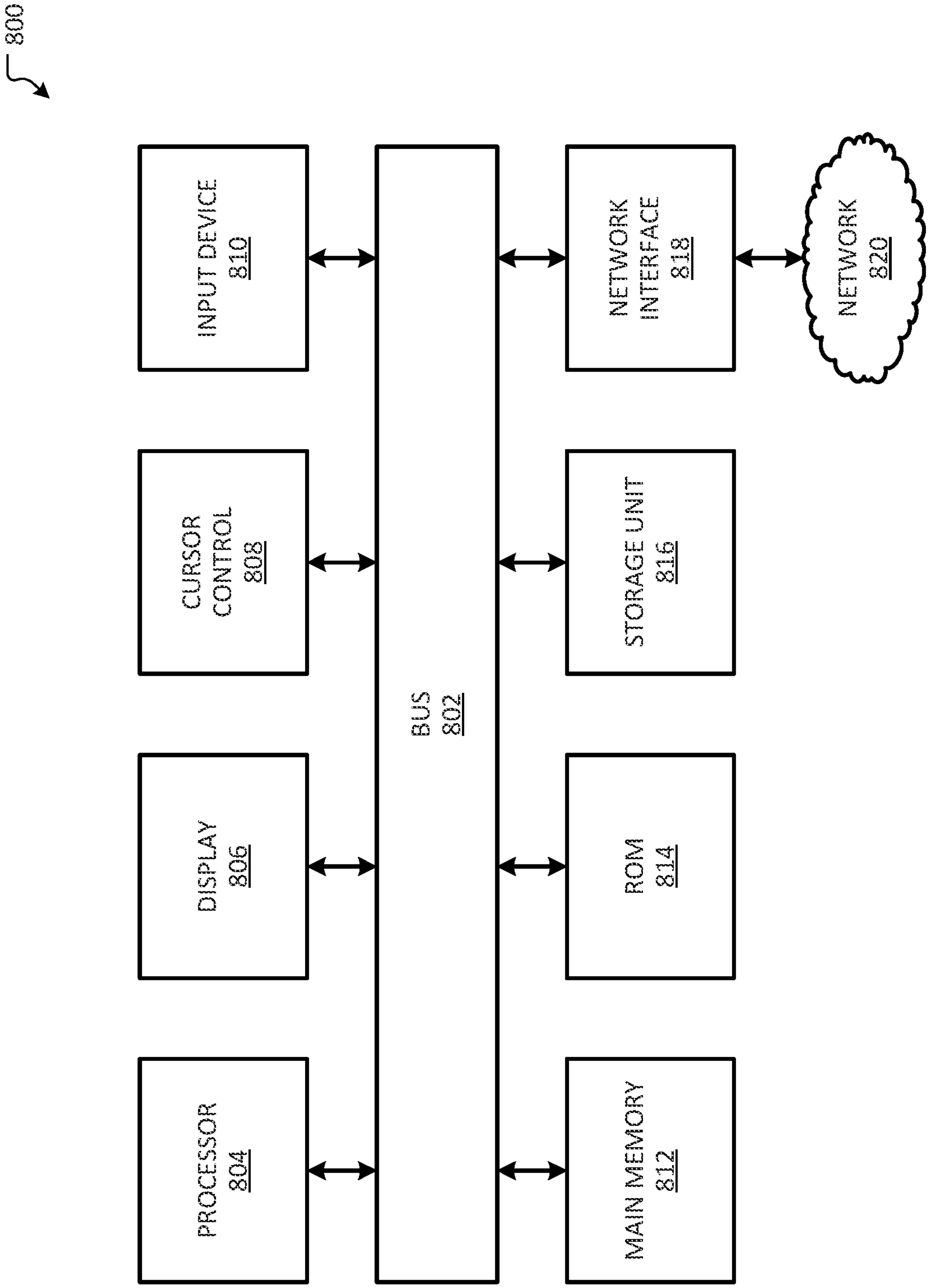
FIG. 8 illustrates a simplified diagram showing a computing system for automatically creating runtime environments, according to certain embodiments of the present disclosure.

FIG. 8 is a simplified diagram showing a computing system for implementing a system 800 for verifying a software product using a software-supply-chain-provenance verification service in accordance with at least one example set forth in the disclosure. This diagram is merely an example, which should not unduly limit the scope of the claims. One of ordinary skill in the art would recognize many variations, alternatives, and modifications.

The computing system 800 includes a bus 802 or other communication mechanism for communicating information, a processor 804, a display 806, a cursor control component 808, an input device 810, a main memory 812, a read only memory (ROM) 814, a storage unit 816, and a network interface 818. In some embodiments, some or all processes (e.g., steps) of methods and/or processes disclosed herein are performed by the computing system 800. In some embodiments, the bus 802 is coupled to the processor 804, the display 806, the cursor control component 808, the input device 810, the main memory 812, the read only memory (ROM) 814, the storage unit 816, and/or the network interface 818. In certain embodiments, the network interface is coupled to a network 820. For example, the processor 804 includes one or more general purpose microprocessors. In some embodiments, the main memory 812 (e.g., random access memory (RAM), cache and/or other dynamic storage devices) is configured to store information and instructions to be executed by the processor 804. In certain embodiments, the main memory 812 is configured to store temporary variables or other intermediate information during execution of instructions to be executed by processor 804. For example, the instructions, when stored in the storage unit 816 accessible to processor 804, render the computing system 800 into a special-purpose machine that is customized to perform the operations specified in the instructions. In some embodiments, the ROM 814 is configured to store static information and instructions for the processor 804. In certain embodiments, the storage unit 816 (e.g., a magnetic disk, optical disk, or flash drive) is configured to store information and instructions.

In some embodiments, the display 806 (e.g., a cathode ray tube (CRT), an LCD display, or a touch screen) is configured to display information to a user of the computing system 800. In some embodiments, the input device 810 (e.g., alphanumeric and other keys) is configured to communicate information and commands to the processor 804. For example, the cursor control component 808 (e.g., a mouse, a trackball, or cursor direction keys) is configured to communicate additional information and commands (e.g., to control cursor movements on the display 806) to the processor 804.

According to certain embodiments, a method to automatically create runtime environments is provided. The method includes: receiving a request to create a runtime environment; automatically generating a cluster of nodes based on the request, wherein the cluster of nodes are configured to run one or more containerized applications for the runtime environment; automatically applying a manifest onto the cluster of nodes, wherein the manifest comprises one or more configurations associated with the runtime environment; and automatically deploying one or more software products into the cluster of nodes. The method is performed using one or more processors. For example, the method is implemented according to at least FIG. 1, FIG. 2, FIG. 3, FIG. 4, FIG. 5, FIG. 6, and/or FIG. 7.

In some embodiments, the request includes an indication of an expiration date corresponding to the runtime environment. In some embodiments, the method further includes automatically destroying the runtime environment on the expiration date. In some embodiments, the request includes an indication of at least one selected from a group consisting of: an environment identifier, environment description, environment ownership, and release channel overrides. In some embodiments, the request includes a desired number of nodes, and the cluster of nodes includes a number of nodes that correspond to the desired number of nodes.

In some embodiments, the request is received from user-input and the user-input is received at a graphical user-interface (GUI). In some embodiments, the one or more products include a runtime operator that is configured to perform one or more actions associated with the one or more software products. In some embodiments, the cluster of nodes is provisioned on at least one selected from a group consisting of: one or more computing devices and one or more servers. In some embodiments, the manifest includes one or more resource configurations.

In some embodiments, the method further includes: receiving an indication of an upgrade corresponding to at least one of the one or more software products; and modifying the runtime environment, based on the indication, to upgrade the at least one of the one or more software products. In some embodiments, the upgrade is based on at least one of an account or subscription.

In some embodiments, the method further includes: receiving one or more inputs corresponding to the runtime environment; and generating the manifest based on the one or more inputs. In some embodiments, the method further includes: receiving information about the runtime environment from a runtime operator; determining one or more action to perform based on the received information; and performing the one or more actions. In some embodiments, the one or more actions include at least one selected from a group consisting of: deploying a new software product into the cluster of node, upgrading a version of a software product in the cluster of nodes, and rolling back a version of a software product in the cluster of nodes.

According to certain embodiments, a system to automatically create runtime environments is provided. The system includes one or more processors; and memory storing instructions that, when executed by the one or more processors, cause the system to perform a set of operations, the set of operations includes: receiving a request to create a runtime environment; automatically generating a cluster of nodes based on the request, wherein the cluster of nodes are configured to run one or more containerized applications for the runtime environment; automatically applying a manifest onto the cluster of nodes, wherein the manifest includes one or more configurations associated with the runtime environment; and automatically deploying one or more software products into the cluster of nodes. For example, the system is implemented according to at least FIG. 1, FIG. 2, FIG. 3, FIG. 4, FIG. 5, FIG. 6, and/or FIG. 7.

In some embodiments, the request includes an indication of an expiration date corresponding to the runtime environment, and the set of operations further includes automatically destroying the runtime environment, on the expiration date. In some embodiments, the set of operations further includes receiving information about the runtime environment from a runtime operator; determining one or more actions to perform based on the received information; and performing the one or more actions. In some embodiments, the one or more actions include at least one selected from a group consisting of: deploying a new software product into the cluster of node, upgrading a version of a software product in the cluster of nodes, and rolling back a version of a software product in the cluster of nodes. According to certain embodiments, a method to automatically create runtime environments is provided. The method includes: receiving a request to create a runtime environment; automatically generating a cluster of nodes based on the request, wherein the cluster of nodes are configured to run one or more containerized applications for the runtime environment; automatically applying a manifest onto the cluster of nodes, wherein the manifest comprises one or more configurations associated with the runtime environment; automatically deploying one or more software products into the cluster of nodes; receiving an indication of an upgrade corresponding to at least one of the one or more software products; and modifying the runtime environment, based on the indication, to upgrade the at least one of the one or more software products. The method is performed using one or more processors. For example, the method is implemented according to at least FIG. 1, FIG. 2, FIG. 3, FIG. 4, FIG. 5, FIG. 6, and/or FIG. 7.

In some embodiments, the upgrade is based on at least one of an account or subscription.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various aspects of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a sub-combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method to automatically create runtime environments, the method comprising:

receiving a request to create a runtime environment;

automatically generating a cluster of nodes based on the request, the cluster of nodes configured to run one or more containerized applications for the runtime environment;

automatically applying a manifest onto the cluster of nodes, the manifest comprising one or more configurations associated with the runtime environment, the manifest comprising one or more resource configurations including a first resource configuration describing how one or more hardware resources are to run in the cluster of nodes and a second resource configuration describing how the one or more containerized applications are to run in the cluster of nodes;

provisioning the one or more hardware resources based on the first resource configuration of the one or more resource configurations; and automatically deploying one or more software products into the cluster of nodes based on the second resource configuration;

wherein the method is performed using one or more processors.

2. The method of claim 1, wherein the request includes an indication of an expiration date corresponding to the runtime environment.

3. The method of claim 2, further comprising: automatically destroying the runtime environment, on the expiration date.

4. The method of claim 1, wherein the request includes an indication of at least one selected from a group consisting of: an environment identifier, environment description, environment ownership, and release channel overrides.

5. The method of claim 1, wherein the request includes a desired number of nodes, and wherein the cluster of nodes includes a number of nodes corresponding to the desired number of nodes.

6. The method of claim 1, wherein the request is received from user-input, the user-input being received at a graphical user-interface (GUI).

7. The method of claim 1, wherein the one or more products include a runtime operator that is configured to perform one or more actions associated with the one or more software products.

8. The method of claim 1, wherein the cluster of nodes is provisioned on at least one selected from a group consisting of: one or more computing devices and one or more servers.

9. The method of claim 1, further comprising:

receiving an indication of an upgrade corresponding to at least one of the one or more software products; and modifying the runtime environment, based on the indication, to upgrade the at least one of the one or more software products.

10. The method of claim 9, wherein the upgrade is based on at least one of an account or subscription.

11. The method of claim 1, further comprising:

receiving one or more inputs corresponding to the runtime environment; and generating the manifest based on the one or more inputs.

12. The method of claim 1, further comprising:

receiving information about the runtime environment from a runtime operator;

determining one or more actions to perform based on the received information; and performing the one or more actions.

13. The method of claim 12, wherein the one or more actions include at least one selected from a group consisting of: deploying a new software product into the cluster of nodes, upgrading a version of a software product in the cluster of nodes, and rolling back a version of a software product in the cluster of nodes.

14. A system to automatically create runtime environments, the system comprising:

one or more processors; and memory storing instructions that, when executed by the one or more processors, cause the system to perform a set of operations, the set of operations comprising:

receiving a request to create a runtime environment;

automatically generating a cluster of nodes based on the request, wherein the cluster of nodes are configured to run one or more containerized applications for the runtime environment;

automatically applying a manifest onto the cluster of nodes, wherein the manifest comprises one or more configurations associated with the runtime environment, the manifest comprising one or more resource configurations including a first resource configuration describing how one or more hardware resources are to run in the cluster of nodes and a second resource configuration describing how the one or more containerized applications are to run in the cluster of nodes;

provisioning the one or more hardware resources based on the first resource configuration of the one or more resource configurations; and automatically deploying one or more software products into the cluster of nodes based on the second resource configuration.

15. The system of claim 14 wherein the request includes an indication of an expiration date corresponding to the runtime environment, and wherein the set of operations further comprises automatically destroying the runtime environment, on the expiration date.

16. The system of claim 14, wherein the set of operations further comprises:

receiving information about the runtime environment from a runtime operator;

determining one or more actions to perform based on the received information; and performing the one or more actions.

17. The system of claim 16, wherein the one or more actions include at least one selected from a group consisting of: deploying a new software product into the cluster of node, upgrading a version of a software product in the cluster of nodes, and rolling back a version of a software product in the cluster of nodes.

18. A method to automatically create runtime environments, the method comprising:

receiving a request to create a runtime environment;

automatically generating a cluster of nodes based on the request, wherein the cluster of nodes are configured to run one or more containerized applications for the runtime environment;

automatically applying a manifest onto the cluster of nodes, wherein the manifest comprises one or more configurations associated with the runtime environment, the manifest comprising one or more resource configurations including a first resource configuration describing how one or more hardware resources are to run in the cluster of nodes and a second resource configuration describing how the one or more containerized applications are to run in the cluster of nodes;

provisioning the one or more hardware resources based on the first resource configuration of the one or more resource configurations;

automatically deploying one or more software products into the cluster of nodes based on the second resource configuration;

receiving an indication of an upgrade corresponding to at least one of the one or more software products; and modifying the runtime environment, based on the indication, to upgrade the at least one of the one or more software products;

wherein the method is performed using one or more processors.

19. The method of claim 18, wherein the upgrade is based on at least one of an account or a subscription.

* * * * *